US007278572B2

(12) United States Patent
Kim et al.

(10) Patent No.: US 7,278,572 B2
(45) Date of Patent: Oct. 9, 2007

(54) SYSTEM FOR ELECTRONICALLY VOTING, COUNTING, AND EXAMINING BALLOTS

(76) Inventors: Yong-Hi Kim, #101, City Village, Seocho-3-dong 1464-7, Seocho-gu, Seoul 137-867 (KR); Young-Tak Kim, #110-704, Joonggye Green Apartment, Joonggye-2-dong 503, Nowon-gu, Seoul 139-863 (KR)

( * ) Notice: Subject to any disclaimer, the term of this patent is extended or adjusted under 35 U.S.C. 154(b) by 117 days.

(21) Appl. No.: 11/201,730

(22) Filed: Aug. 11, 2005

(65) Prior Publication Data

US 2006/0196939 A1 Sep. 7, 2006

(30) Foreign Application Priority Data

Mar. 2, 2005 (KR) ............... PCT/KR2005/000568

(51) Int. Cl.
*G06K 17/00* (2006.01)

(52) U.S. Cl. .................. 235/386; 235/375; 235/462.01

(58) Field of Classification Search ................ 235/386, 235/375, 462.01
See application file for complete search history.

(56) References Cited

U.S. PATENT DOCUMENTS

| | | | | |
|---|---|---|---|---|
| 3,941,976 | A * | 3/1976 | Huhn | 235/54 F |
| 4,649,264 | A * | 3/1987 | Carson | 235/54 R |
| 5,377,099 | A * | 12/1994 | Miyagawa | 705/12 |
| 5,557,096 | A * | 9/1996 | Watanabe et al. | 235/492 |
| 6,081,793 | A * | 6/2000 | Challener et al. | 705/50 |
| 6,412,692 | B1 * | 7/2002 | Miyagawa | 235/382 |
| 6,550,675 | B2 * | 4/2003 | Davis et al. | 235/386 |
| 2004/0046021 | A1 * | 3/2004 | Chung | 235/386 |

FOREIGN PATENT DOCUMENTS

| | | |
|---|---|---|
| JP | 7 282150 | 10/1995 |
| JP | 2000 40111 | 2/2000 |
| KR | 0133954 | 12/1997 |
| KR | 2003 0038889 | 5/2003 |
| KR | 2003 0079844 | 10/2003 |
| KR | 2003 0097054 | 12/2003 |

* cited by examiner

*Primary Examiner*—Michael G. Lee
*Assistant Examiner*—Tuyen K Vo
(74) *Attorney, Agent, or Firm*—Ladas & Parry LLP

(57) ABSTRACT

There is provided an electronic voting and counting system including an electoral register check system, an electronic voting system, an electronic counting system, and an electronic examination system. The electronic voting system operated by interworking with a voter DB online or offline stores image files of candidate information of nationwide election district inputted via an external storage medium in the electronic voting apparatus, displays an image file of candidate information of an election district to which the voter belongs according to information stored in the electronic voting card, automatically guides a voting procedure to the voter when the electronic voting card is deposited, encodes a voting result to doubly store in a storage medium, and prints the voting result.

19 Claims, 7 Drawing Sheets

SYSTEM FOR ELECTRONICALLY VOTING, COUNTING, AND EXAMINING BALLOTS

This application claims the benefit of International Application No. PCT/KR2005/000568, filed on Mar. 2, 2005, the disclosure of which is incorporated herein in its entirety by reference.

BACKGROUND OF THE INVENTION

1. Field of the Invention

The present invention relates to an electronic voting, counting, and examination system, and more particularly, to an electronic voting, counting, and examination system which employs an electoral register identification system shared on network, an electronic voting system managed online or offline, an electronic counting system counting votes online or offline in real time, and an electronic examination system examining votes by safely keeping vote recording paper as a cartridge, thereby effectively coping with hacking outside or error occurrence such that the system can be stably operated.

2. Description of the Related Art

Usually, in the election of the President or the Member of the National Assembly, a voter goes to a polling place, selects a candidate in a ballot paper, and puts the ballot paper into a ballot box. The ballots are counted and the total of the ballots are computed by hand. Accordingly, there are a lot of time and effort used, and an error may occur in the counting and computing.

An electronic voting apparatus and electronic voting system are provided in order to solve the problem of the voting and counting by hand and rapidly and accurately manage voting and totalization by applying high-tech information technology in election field to accelerate the efficiency of the voting management.

For example, an electronic voting system disclosed in Korean Patent No. 0133954 is described as following.

That is, one or a plurality of voting terminal apparatus are installed at each polling place. Data of the number of votes obtained of each candidate accumulated in a buffer counting the number of votes obtained of each election terminal apparatus is wired or wirelessly transmitted to a terminal control apparatus via a communication interface. The terminal control apparatus is installed, for example, for each area. The terminal control apparatus receives data of the number of votes obtained, which is accumulated in each election terminal apparatus and computes the total of the number of votes obtained for each candidate. Also, data of the number of votes obtained totalized by the terminal control apparatus is wired or wirelessly transmitted to a main computer. The main computer totalizes the data of the number of votes obtained, which is transmitted from the terminal control apparatus or election terminal apparatus.

For another example of prior art related to an electronic voting system, an electronic voting system is disclosed in Korean Patent No. 407076.

In the prior art, an electronic voting controller having data and application programs required for operating the system, built-in and an electronic voting system including an electronic voting apparatus connected to the electronic voting controller via cable are included. In this case, the electronic voting controller and electronic voting apparatus embody a network in thin-client environment, and windows based terminal (WBT) technology is employed in the electronic voting apparatus. Therefore, convenience of usage of voters is increased, centralized network management is possible, and system construction cost is minimized.

However, since the electronic voting system according to the prior art, whose entire components are connected via network, when a backing is attempted outside or an operation error occurs, the system administration is going to suffer.

SUMMARY OF THE INVENTION

To solve the problems, the present invention provides an electronic voting and counting system which manages an electronic voting system online or offline in order to share an electoral register identification system on network, thereby effectively coping with an emergency situation such as a hacking attempted outside or a system error.

The present invention also provides an electronic examination system in which rapid counting and totalization is possible via a backup system or a dual storage device in case that damage or error of data occurs and an accurate verification after the fact is possible in case of occurrence of a dispute on the voting result.

According to an aspect of the present invention, there is provided an electronic voting system including: a voter identification terminal which searches a predetermined voter database connected to network to identify voters and stores whether the voter votes in the voter database via a substantially real-time storage method when the identification of the voter and whether the voter makes a double vote are finished; an electronic voting card issue apparatus issuing an electronic voting card which has a function to display information on an election and an election district, and an image of candidate combination of a belonging election district and a function to remove stored information after voting is finished; and an electronic voting apparatus being operated by interworking with the voter database using on-line or off-line method, guiding the voter with a balloting procedure when the voter deposits the electronic voting card, and storing a voting result by the voter.

The electronic voting system may include a candidate information storage unit storing the image of registered candidate combination of each election district; a display apparatus displaying the image of the candidate combination of the election district to which the voter belongs stored in the candidate information storage unit, based on the information stored in the electronic voting card; an input unit allowing the voter to select one of the candidates displayed on the display apparatus; a voting result storage medium storing the voting result; and an output unit for printing and outputting the voting result on a vote recording paper.

A barcode with a particular form, which indicates information including the voting result may be printed on the vote recording paper and decoded only by a predetermined barcode reader. Accordingly, the output unit may print and output the voting result on the vote recording paper in letters and barcodes whose form is so particular that the barcode is impossible to read by a conventional reader.

In the embodiment of the present invention, the electronic voting card may be one of a smart card having an algorithm for an electronic signature, encoding and security built-in, a magnetic card, a card on which a barcode is shown, and an RFID card. Also, the output unit may be installed inside the electronic voting apparatus or outside additionally, in which barcode indicating information including the voting result in order to easily grasp the voting result in counting votes may be printed.

According to another aspect of the present invention, there is provided an electronic vote examination system including: an input unit inputting the information recorded in the vote recording paper; a display unit outputting vote examination result based on the inputted information; and a search unit searching the vote examination result.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, an electronic voting, counting, and examination system according to the present invention will be described in detail with reference to the attached drawings.

Figure 1:
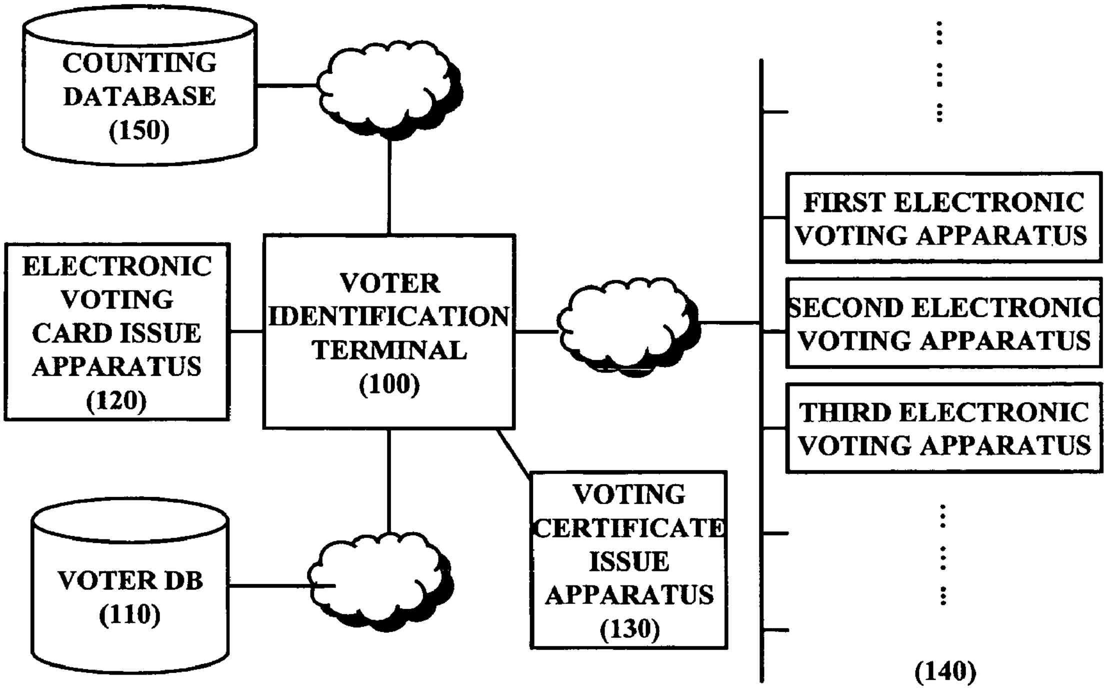
FIG. 1 is a diagram schematically illustrating the connection of an electronic voting and counting system operated online in an embodiment of the present invention.

FIG. 1 is a diagram schematically illustrating the connection of an electronic voting and counting system operated online in an embodiment of the present invention.

According to the present invention, a voter identification terminal 100 may be connected to a voter DB 110, a plurality of electronic voting apparatuses 140, and a counting DB 150 via a wired/wireless network and systemically connected to an electronic voting card issue apparatus 120 and voting certificate issue apparatus 130.

The electronic voting and counting system receives an administrator card which is in a form of smart card to authenticate the administrator and the system, and controls the voting to start in case that the authentication is successful.

A voter accesses the voter DB 110 by using the voter identification terminal 100 connected to a private network via a communication network and a predetermined database (DB) server and checks an electoral register. In this case, the voter DB 110 stores voter information drawn up by integrating nationwide or locally. The voter DB 110 may be directly drawn up by whoever is in charge of elections and constructed by receiving a recording medium storing the electoral register information from local government competent offices or receiving the electoral register information online via network. Also, when a change occurs in the information related to voters, the change may be reflected in the voter DB 110 in real-time and it is checked in real-time whether a voter votes such that a double vote can be prevented in all sorts of voting systems.

When the procedure of checking the electoral register and voter identification is finished, it is stored in the voter DB 110 in substantially real-time whether the voter votes. The electronic voting card issue apparatus 120 issues an electronic voting card with functions to display information related to the election and election district and the image of candidate combination of affiliate election district and to remove the stored information after the vote is finished to the voter. In this case, the electronic voting card is preferably embodied as a form of a smart card. The smart card may include an electronic signature and an algorithm for encoding and security. The smart card may be embodied as a magnetic card, an RFID card, or a card in which a barcode is printed, in addition to the smart card.

The voter deposits the issued electronic voting card in the electronic voting apparatus 140, thereby starting a voting procedure. That is, information on all nationwide candidates is stored in the electronic voting apparatus 140, the image of the candidate combination is automatically displayed on a monitor such as a touch screen with voice guidance for each election district to which the voter belongs based on the stored candidate information, and the voter votes according to the procedure.

On the other hand, when the voter finishes the voting, the vote certificate issue apparatus 130 may print a certificate proving that the voter performs voting and provide to the voter. When the certificate is shown, various events or benefits at government level such as public parking fee discount or national park entrance fee discount may be provided.

Figure 2:
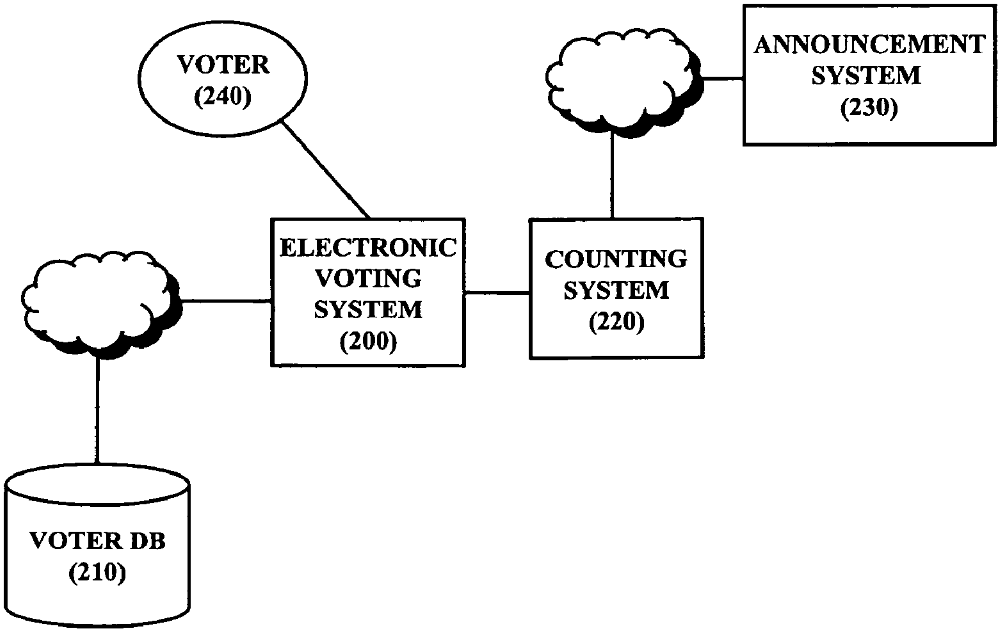
FIG. 2 is a diagram schematically illustrating the connection of an electronic voting and counting system operated by online and offline complex methods in an embodiment of the present invention.

FIG. 2 is a diagram schematically illustrating the connection of an electronic voting and counting system operated by online/offline methods according to an embodiment of the present invention.

The electronic voting and counting system receives an administrator card which is in a form of smart card to authenticate the administrator and the system, and controls the voting to start in case that the authentication is successful.

Referring to FIG. 2, a voter 240 entering a polling place shows an ID card to an election judge, and the election judge accesses a voter DB 210 via a communication network and DB server by using an electronic voting system 200 connected to a private network and performs an electoral register check procedure. In this case, the detailed description of the voter DB 210 will be omitted because the voter DB was previously described.

The election judge checks whether he or she has a right to vote and whether it is a double vote via the procedure of checking the electoral register and asks the voter 240 to make an electronic signature such as an electronic pen, iris recognition, and fingerprint recognition by using a predetermined electronic signature apparatus (not shown), thereby identifying the voter 240. The identification procedure may be performed by biometrics such as fingerprint recognition and iris recognition, in addition to the electronic signature using the electronic pen.

When the procedure of checking the electoral register and voter identification is finished, it is stored in the voter DB 210 in substantially real-time whether the voter 240 votes. According to the command inputted by the election judge, the electronic voting system 200 issues an electronic voting card with functions to display information related to the election and election district and the image of candidate combination of affiliate election district and to remove the stored information after the vote is finished to the voter 240.

The voter 240 receiving the electronic voting card enters a polling booth installed at the polling place and votes. The voter 240 deposits the received electronic voting card into a predetermined electronic voting apparatus of the electronic voting system 200, thereby starting the voting procedure.

On the other hand, the electronic voting system 200 may be operated by interworking with a predetermined counting system 220 in off-line method. The counting system 220 may be operated by interworking with a predetermined announcement system 230 for announcing the election result via wired/wireless network.

Figure 3:
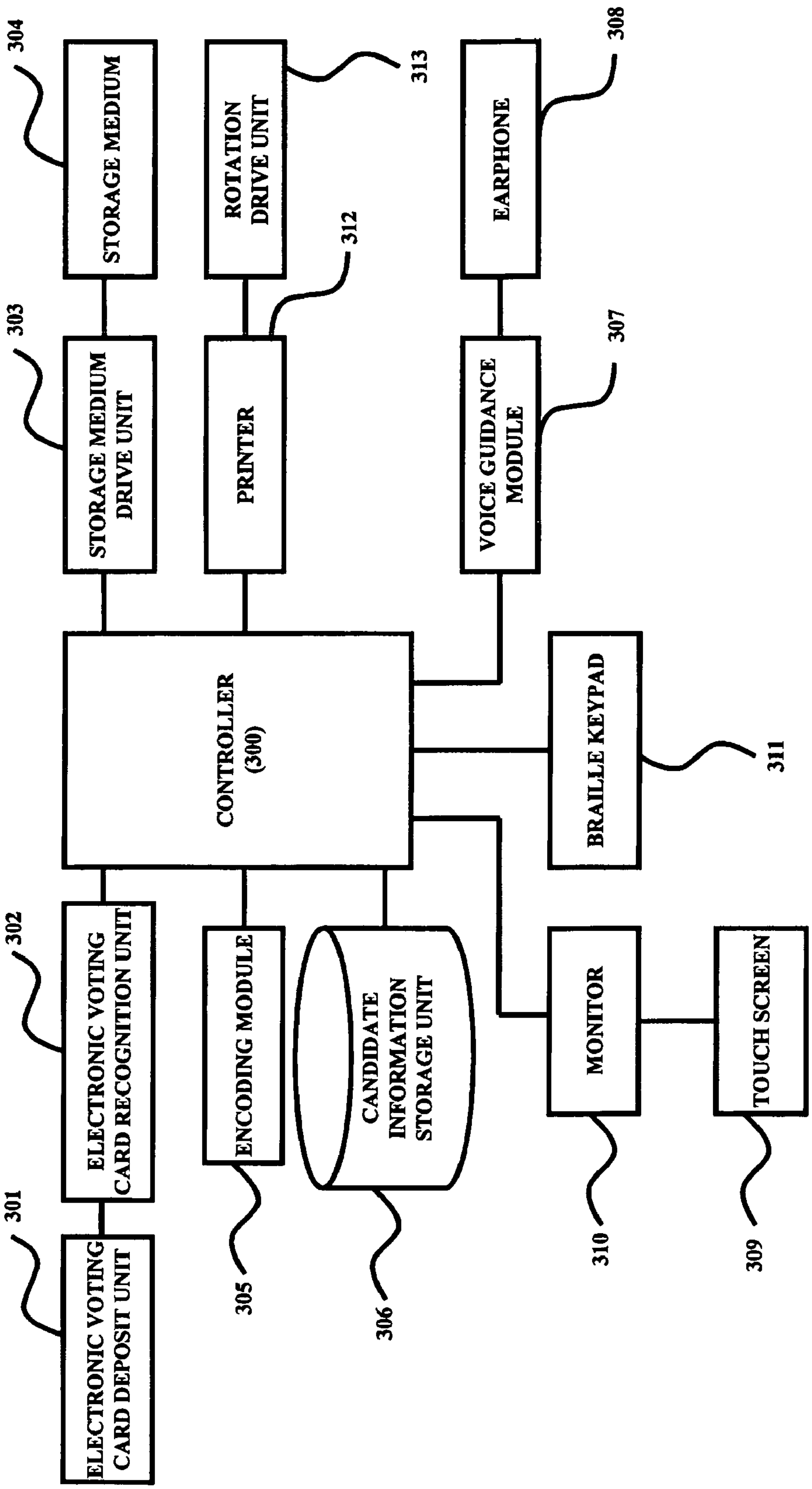
FIG. 3 is a diagram illustrating a configuration of an electronic voting system controller according to an embodiment of the present invention.

FIG. 3 is a diagram illustrating a configuration of an electronic voting system controller according to an embodiment of the present invention.

The electronic voting apparatus controller of FIG. 3 may include a controller 300, an electronic voting card deposit unit 301, an electronic voting card recognition unit 302, a storage medium drive unit 303, a storage medium 304, an encoding module 305, a candidate information storage unit 306, a voice guidance module 307, an earphone 308, a touch screen 309, a monitor 310, a Braille keypad 311, a printer 312, a rotation drive unit 313. Also, programs coupled with the controller 300 may be installed, such as an OS program, an application program for vote management, and a touch screen application program.

When a voter receiving an electronic voting card from an election judge deposits the electronic voting card in order to start the voting procedure, the electronic voting card deposit unit 301 transfers the electronic voting card to the inside of the electronic voting apparatus and discharges the electronic voting card outside according to a control signal of the controller 300 when the entire voting procedure is finished.

The electronic voting card recognition unit 302 reads information recorded in the electronic voting card transferred inside by the electronic voting card deposit unit 301.

The OS program is an operating system used such that the electronic voting system controller can be operated as an information processing terminal like a general personal computer. For example, a window program of Microsoft Company may be applied.

The application program for voting management is a program for controlling the entire system according to the electronic voting apparatus controller and environment establishment and vote progress of the electronic voting apparatus.

The touch screen application program is a device driver and control program for driving the touch screen 309 that is an input means of the electronic voting apparatus.

The storage medium drive unit 303 is a storage unit for storing the voting result determined according to a polling procedure described after. To strengthen security, the voting result is encoded by the encoding module 305 according to a predetermined encoding method and stored in the storage medium 304.

The candidate information storage unit 306 stores information related to candidates of all nationwide election districts in a mobile storage medium, and the image of a candidate combination of an election district to which a voter belongs may be displayed by the candidate information.

Voice data for guiding the vote progress procedure is stored in the voice guidance module 307.

The touch screen 309 is an input means for transmitting the input via a touch panel installed at the monitor 310 to the controller 300. The Braille keypad 311 is a keypad with the top surface on which raised letters are embossed, via which information is inputted and selected as the touch screen 309.

The earphone 308 transmits the voice data extracted from the voice guidance module 307 outside. The printer 312 prints the voting result based on the input via the touch screen 309 or the Braille keypad 311 on a vote recording paper and outputs. The rotation drive unit 313 performs a function to collect the vote recording papers by interworking with the operation of the printer 312.

The controller 300 controls the entire system based on the OS program, the application program for voting management, and the touch screen application program installed at the controller 300.

According to an embodiment of the present invention, the monitor 310 equipped with a touch panel for using the touch screen 309 is installed in a predetermined protection box such that the front of the monitor 310 is exposed outside the protection box. In this case, the monitor 310 may be manufactured to form a single body with a main body or separately manufactured and attached to the main body. The printer 312 is installed on the board in the protection box such that the output surface of a predetermined vote recording paper, on which the voting result is printed, is transparent via a predetermined window provided in one side of the protection box. In this case, the printer 312 may be embodied by being installed at outside the electronic voting apparatus and connected to the electronic voting apparatus via a connection cable, and the window may be formed as a convex lens such that the voter can easily check the voting result.

According to an embodiment of the present invention, the protection box of the electronic voting apparatus may be manufactured by using an opaque material. However, such that a voter can check the process of printing the voting result on the vote recording paper and the process of keeping the vote recording paper in which the voting result is printed, the external form of the electronic voting apparatus including the protection box may be manufactured by a transparent material.

In the vote recording paper in which the voting result is printed, not only the vote result is indicated by letters or numbers but also a barcode with a particular form to effectively perform an examining procedure that will be described later is additionally printed. That is, the barcode with the particular form indicating information including the voting result is printed in the vote recording paper, the barcode with the particular form can be read by a predetermined barcode reader, and the barcode with the particular form, which can not be read by a conventional reader, is additionally printed.

On the other hand, separately from the vote recording paper, when the voter finishes voting, a certificate proving that the voting is performed may be printed and provided to the voter. In case that the certificate is shown, various events or benefits at government level such as public parking fee discount or national park entrance fee discount may be provided.

Also, according to an embodiment of the present invention, the Braille keypad 311 may be a separated keypad for visually handicapped voters in order to be disposed in a position where the visually handicapped voters can easily approach. The earphone 308 is disposed adjacently to the Braille keypad 311, and a vote recording paper collection roll rotated by interworking with print output of the printer 312 is installed adjacently to the printer 312 on the board to wind and store the vote recording paper in which the voting result is printed. In this case, the rotation drive unit 313 rotates the vote recording paper collection roll in order to be coupled with the operation of the printer.

The Braille keypad 311 and earphone installed at the electronic voting apparatus may be used as polling input means or means guiding a polling procedure for the visually handicapped voters. Also, voice guidance may be performed via the earphone 308 for guiding the polling procedure to the voters. Also, the touch panel installed in the front of the monitor 310 of the electronic voting apparatus for the touch screen 309 is an input means used such that the voter performs the polling procedure and may be manufactured by, for example, tempered glass with high durability.

On the other hand, according to an embodiment of the present invention, the vote recording paper in which the voting result of the voter is printed by the printer 312 of the electronic voting apparatus may be kept as being wound by the collection roll. However, in order to solve the problem of the limit of the size of the vote recording paper wound by the collection roll, a supply unit and a storage unit of the vote recording paper may be additionally installed outside the electronic voting apparatus. An example of the storage unit described above may be a cartridge safely storing the roll of the vote recording paper in which the voting result is printed, and the cartridge itself is transferred to the examination system when the voting is finished, thereby preventing damage or deform of the roll of the vote recording paper, which may be generated.

A slot is additionally provided for depositing the electronic voting card of the voter, and the electronic voting card deposition unit 301 may be installed in the slot.

The electronic voting apparatus displays the image of the candidate combination of the election district according to the information indicated or stored in the electronic voting card such that the voter performs the polling procedure according to the concept of the view shown in the monitor 310, that is, the touch screen 309. When the voter deposits the electronic voting card via the slot of the electronic voting apparatus, the electronic voting card is not discharged outside until the voter finishes the voting procedure. Also, such that the electronic voting card cannot be withdrawn before the voter finishes the voting procedure, the entire body of the electronic voting card is perfectly deposited into the electronic voting apparatus.

The information stored in the electronic voting card is deleted when the voting procedure is finished, and the electronic voting card may be reused via a procedure of inputting election information on another voter. Also, when the voting procedure is finished, the electronic voting card may be automatically discharged via the slot of the electronic voting apparatus. In order to prevent a case in which the voter does not withdraw the electronic voting card after the voter finishes the voting procedure, a device performing voice guidance notifying the withdrawal of the electronic voting card or outputting a warning sound or a warning signal when a predetermined amount of time is passed may be added.

Also, in order to prevent a hindrance according to data loss due to a system error, the voting result storage medium 304 or the candidate information storage unit 306 may be composed of different kinds of storage media or the same kind of a plurality of storage media for repeatedly storing the same data, such as HDD, FDD, CD, DVD, flash memory cards, USB memories.

Also, an additional display notifying that a system error of the electronic voting apparatus occurs or the voting procedure progress of the voter, for example, voting standby state, normal voting, voting delay, and hindrance occurrence is installed wired/wireless, thereby easily checking the voting progress and hindrance state. To prevent the matter of power source due to an instant power stoppage, a sudden power stoppage, a sudden change of load, fluctuation of power voltage, and power source noise and constantly supply stable power to each the electronic voting apparatus, a uninterruptible power supply (UPS) with an automatic voltage regulator (AVR) function may be used. Also, an additional storage device for backup of the newest information recorded in the voting result storage medium or the candidate information storage medium when an emergency such as the matter of power occurs may be added.

Figure 4:
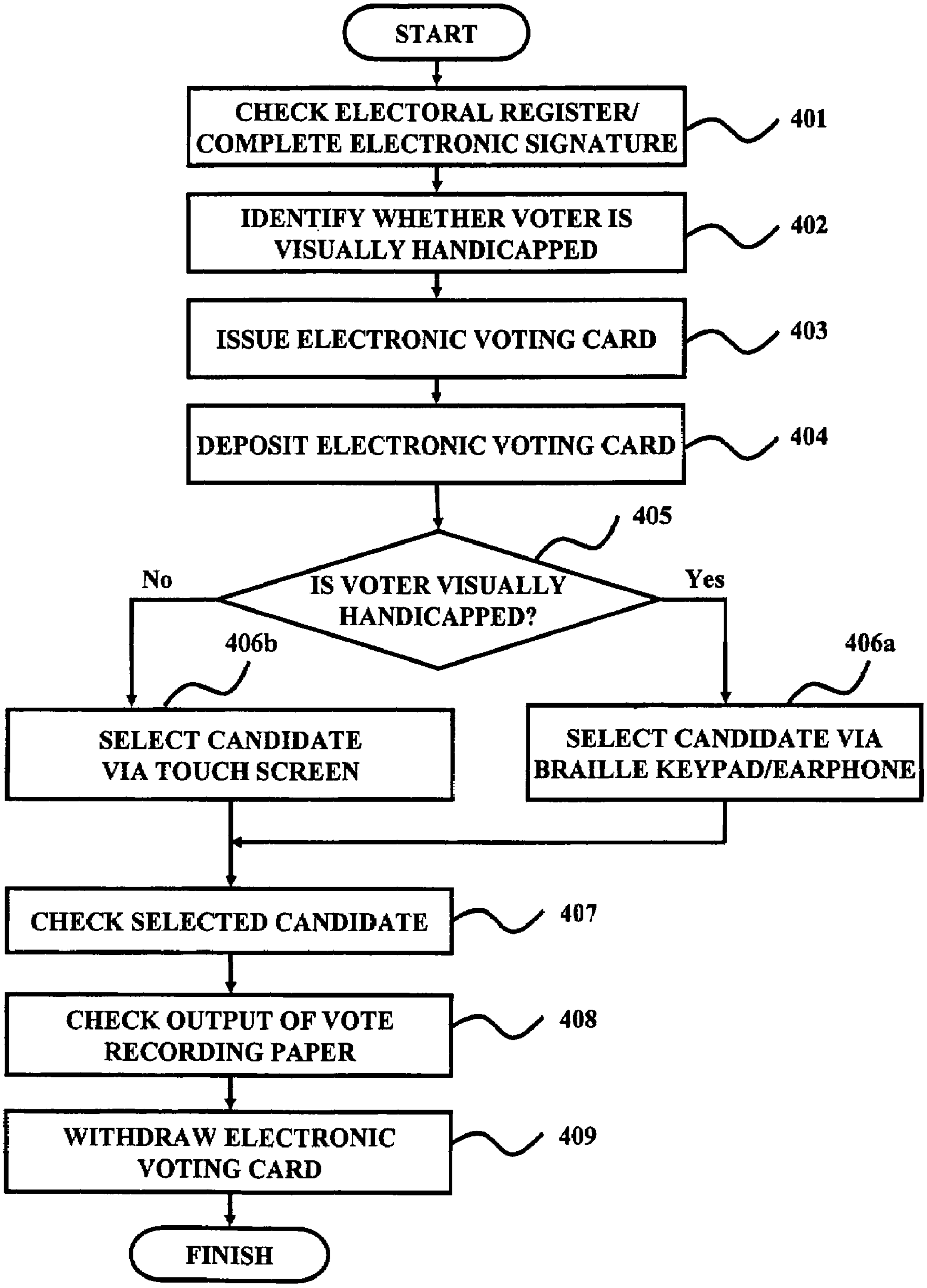
FIG. 4 is a flow chart illustrating the procedure of electronic voting using the electronic voting and counting system according to an embodiment of the present invention.

FIG. 4 is a flow chart of the procedure of electronic voting using the electronic voting and counting system according to an embodiment of the present invention.

When an electoral register is checked and electronic signature is completed in step of 401, an election judge checks whether a voter is visually handicapped and inputs information corresponding to the voter via a voter identification terminal in step of 402. In case that information for identifying the visually handicapped is previously stored in a voter DB, the election judge does not have to perform additional input.

An electronic voting card issue apparatus issues an electronic voting card to the voter in step of 403, and the voter enters an unemployed polling booth and deposits the electronic voting card into an electronic voting card deposit unit in step of 404.

In case that the voter is determined as the visually handicapped in step of 405, when the electronic voting card is read by the electronic voting apparatus, the voter selects a candidate via an earphone and a Braille keypad according to the guidance of the electronic voting apparatus in step of 406*a*. In case that the voter is not determined as the visually handicapped in step of 405, the voter selects a candidate via a touch screen in step 406*b*.

The voter checks the selected candidate one more time according to the guidance of the electronic voting apparatus in step of 407 checks the output of a vote recording paper via a window in step of 408, and withdraws the electronic voting card via the electronic voting card deposit unit in step of 409, thereby finishing the entire voting procedure.

Figure 5:
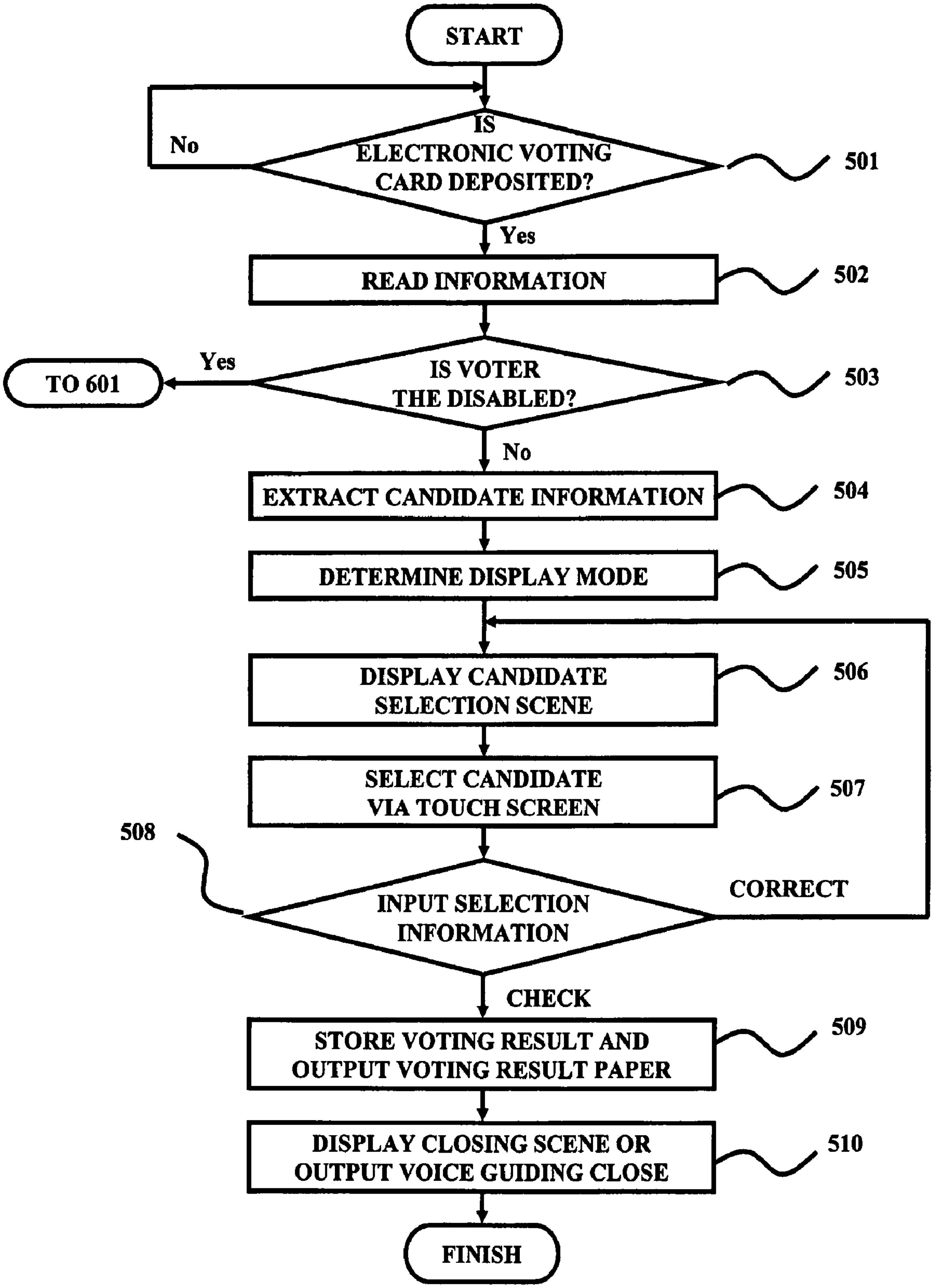
FIGS. 5 and 6 are flow charts illustrating the signal process procedure of the electronic voting system controller.
Figure 6:
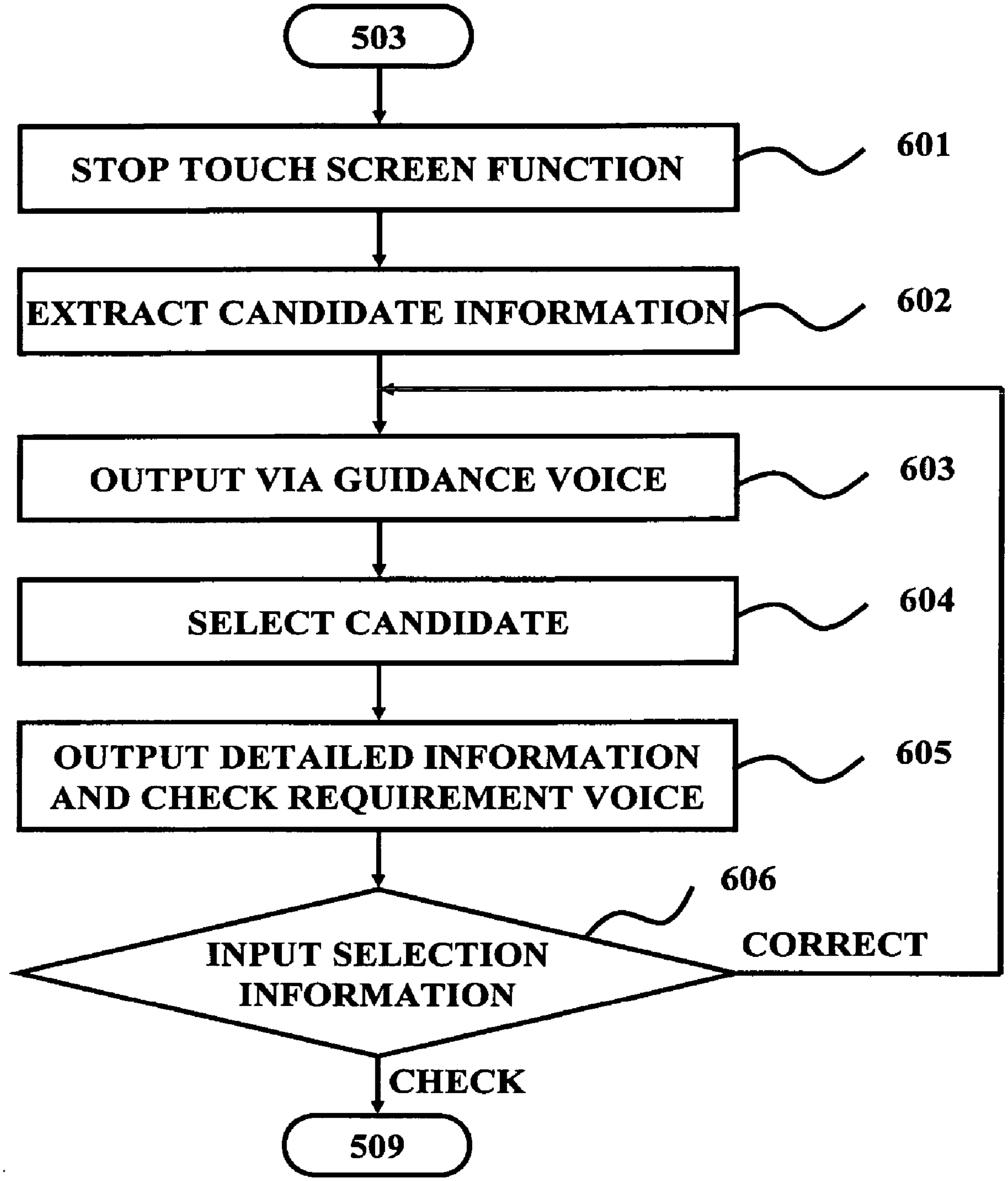

FIGS. 5 and 6 are flow charts illustrating the signal process procedure of an electronic voting apparatus controller in an embodiment of the present invention.

The electronic voting apparatus continuously checks whether an electronic voting card is deposited via an electronic voting card deposit unit while an initial view is displayed in step of 501.

If the electronic voting card is deposited via the electronic voting card deposit unit, the electronic voting card deposit unit transfers the electronic voting card to the inside of the electronic voting apparatus, an electronic voting card recognition unit reads information stored or printed in the electronic voting card and provides to a controller in step of 502.

In step of 503, the controller checks whether a voter is the disabled based on the electronic voting card read information, activates a touch screen in case that the voter is normal, and activates a Braille keypad and an earphone in case that the voter is the disabled. In this case, an initial value may be set to activate the touch screen and additional activation process is performed in case of the disabled.

When the voter is normal, the Braille keypad and the earphone are deactivated and the touch screen is activated. The controller extracts registered candidate information of an election district based on data stored in a candidate DB for each election district stored in a candidate information storage unit in step of 504 and determines a display mode according to the extracted candidate information in step of 505. This is for providing several forms of candidate selection view, in which the allocated size for each candidate on view is different according to the number of the candidates.

When the display mode is determined, a predetermined candidate selection view is displayed on a monitor of the electronic voting apparatus, that is, touch screen in step of 506, and the electronic voting apparatus performs view or voice guidance on information with respect to the indicated candidate and a candidate selection method.

In step of 507, when the voter pushes a certain candidate allocation area on the view according to the guidance of the electronic voting apparatus, a coordinate corresponding to the candidate allocation area is recognized by the touch screen, and the electronic voting apparatus identifies the candidate selected by the voter based on the coordinate information, searches the candidate DB for each election district, extracts detailed information of the selected candidate, and outputs on the monitor.

Therefore, candidate detailed information and check view are displayed on the monitor and related voice guidance is performed, and information of selecting correct or check button by the voter is inputted in the electronic voting apparatus via the coordinate information transmission/reception procedure in step of 508.

The polling procedure is progressed in a way different from the described method in case that the voter is the visually handicapped. That is, the electronic voting apparatus stops the function of the touch screen in step of 601 and extracts candidate information from data stored in the candidate DB for each election district in step of 602. The electronic voting apparatus outputs the number and schematic information of the candidate by voice guidance via the earphone in step of 603.

When the voter receiving the candidate information via the earphone handles the Braille keypad and selects a certain candidate in step of 604, the electronic voting apparatus identifies the candidate selected by the voter based on a key signal, searches the candidate DB for each election district, extracts the detailed information of the selected candidate, and outputs the detailed information of the selected candidate and the check requirement voice via the earphone in step of 605. In step of 606, information of selecting correct or check button of the Braille keypad by the voter is inputted in the electronic voting apparatus via the key signal transmission/reception procedure.

If candidate selection is finished by touching the check button shown on the monitor, that is, the touch screen, a printer of the electronic voting apparatus prints a voting result according to the polling procedure on a predetermined vote recording paper and outputs in step of 509.

Figure 7:
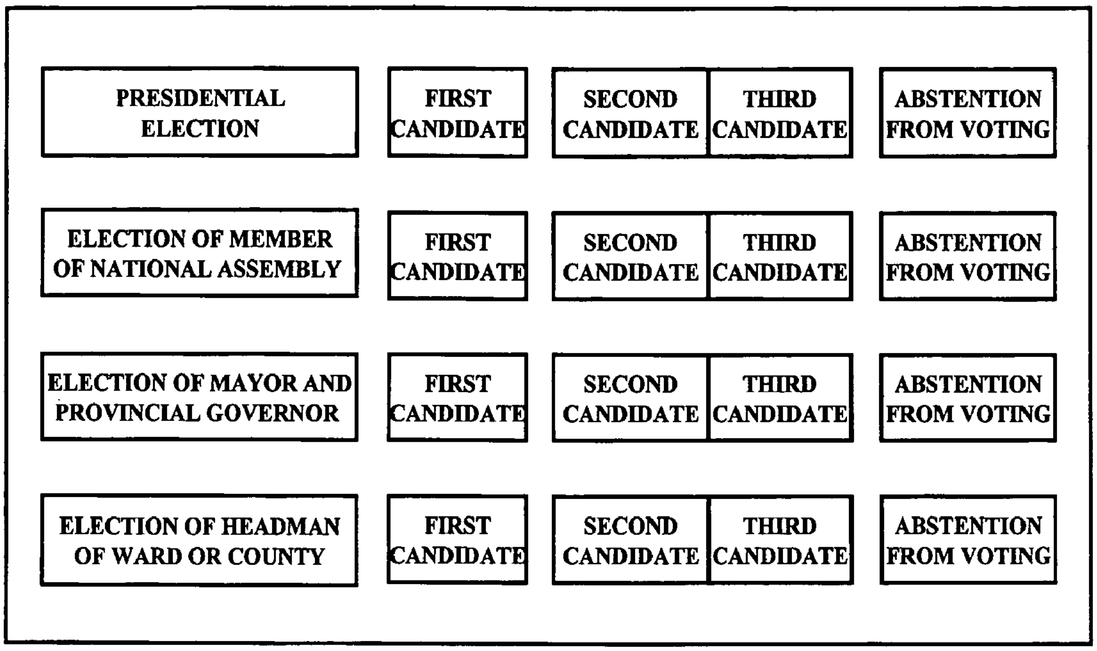
FIG. 7 is a diagram illustrating an example of a candidate selection view in which abstention from voting is possible for each election in case that a plurality of elections is executed simultaneously.

FIG. 7 is a diagram illustrating an example of a candidate selection view in which when a plurality of elections are performed at the same time, abstention from voting can be possible for each election, in an embodiment of the present invention. Also, FIG. 8 is a diagram illustrating an example of a candidate selection view in which a voter performs voting on some elections and selects abstention from voting on other elections in the candidate selection view of FIG. 7.

Figure 8:
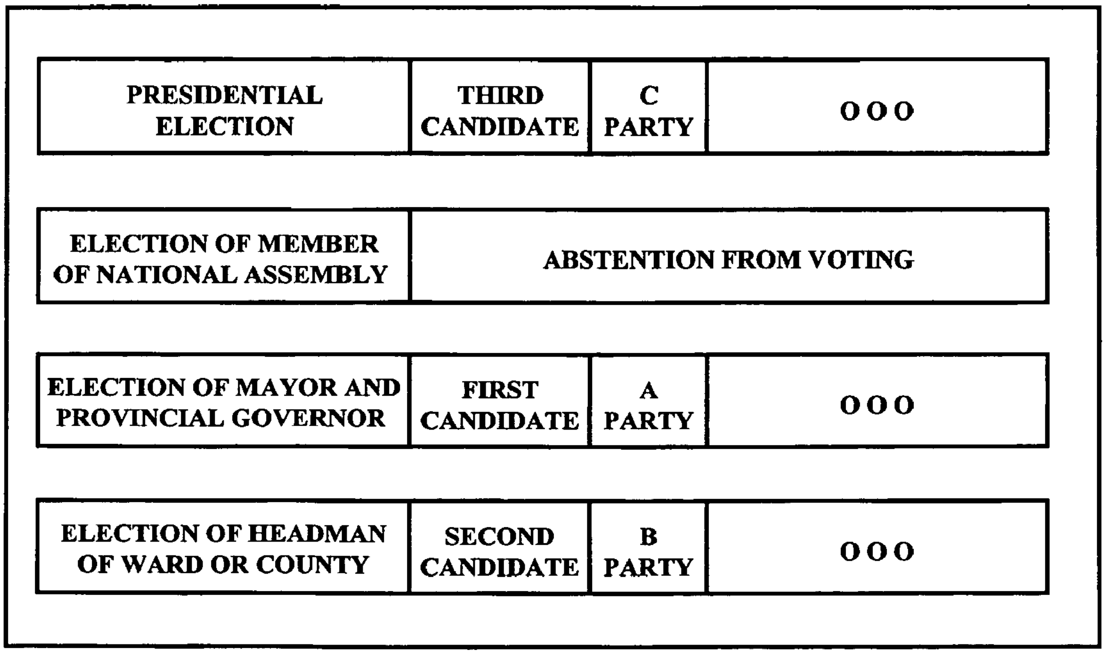
FIG. 8 is a diagram illustrating an example of a candidate detailed information view in which a voter performs voting on an election and abstains from voting on another election in the candidate selection view of FIG. 7.

Referring to FIGS. 7 and 8, according to an embodiment of the present invention, when a plurality of elections are executed, abstention from voting with respect to a certain election is possible and a limit delay vote to select a plurality of candidates is possible.

When the candidate selection procedure, that is, the polling procedure is finished, a close button indicating that the polling procedure is finished is shown on the monitor, that is, the touch screen. In case that the voter touches the close button, the electronic voting card deposit unit of the electronic voting apparatus discharges the deposited electronic voting card outside, stores a vote recording paper in which the voting result is printed in a storage box by rotating a predetermined collection roll, and display a close view or outputs a close guidance voice via the earphone.

On the other hand, the controller of the electronic voting apparatus stores voting result data obtained by the polling procedure in a vote result storage medium via a storage medium drive unit. In this case, the voting result data is stored after encoded by an electronic signature and an algorithm for encoding and security of a smart card.

When the voting is finished according to the procedure, the voting result of the polling place stored in a voter identification terminal is transmitted online or the electronic voting apparatus and voting result storage medium is sealed and transferred. This is executed by moving the voting result storage medium installed in the electronic voting apparatus installed in each polling place and vote recording paper to a designated counting place.

Figure 9:
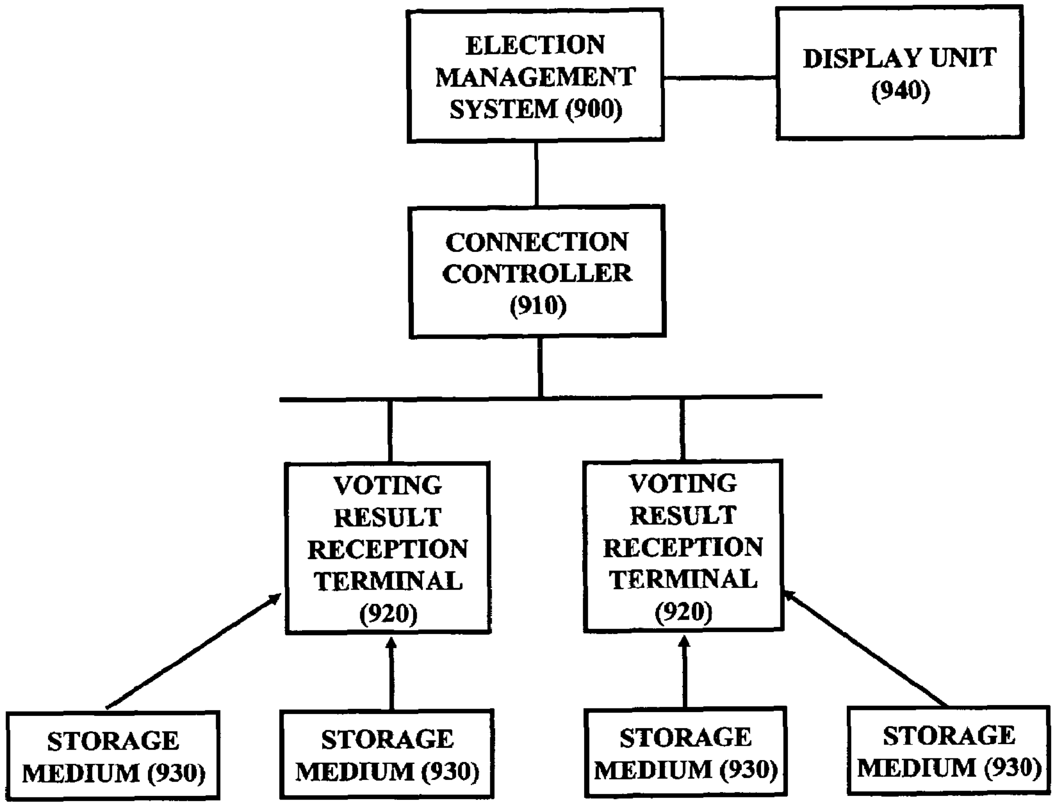
FIG. 9 is a block diagram illustrating the configuration of the electronic counting system according to an embodiment of the present invention.

In case that the voting result is not transmitted online but transferred to the counting place by an offline method, a storage medium 930 is connected to an election management system 900 installed at the counting place. FIG. 9 is a block diagram illustrating the configuration of an electronic counting system according to an embodiment of the present invention and shows an example of a form in which the voting result storage medium 930 is connected to the election management system 900 installed at the counting place. That is, a voting result reception terminal 920 reads encoded voting result data from the voting result storage medium 930 in which the voting result data based on the result of selecting candidate via the electronic voting apparatus is encoded and stored. The election management system 900 is connected to the voting result reception terminal 920 via a connection controller 910, for example, a hub to count and totalize the voting result for each election or for each election district. The electronic voting and vote-counting system has a function of automatically processing the recognition, counting, and discharge of vote recording medium, a function of computing the total and selectively computing one of a certain election and a candidate, a function of visually displaying the procedure of computing, a function of displaying the possibility of election, the image, and the career of the candidate for each candidate by using a statistical method in the procedure of the counting, and a function of broadcasting the present condition of the computing of a counting place via Internet in substantially real-time.

On the other hand, the counting and totalization result of the election management system 900 may be arrayed for each candidate and for each election district to be shown in a display unit 940. Also, the counting and totalization result of the election district to which the voting result storage medium belongs is preferentially shown, and other election districts may be additionally shown in administrative order.

As the method of vote-counting, the recognition, the counting, and the discharge of vote recording medium such as CD-ROM are automatically processed and a message is shown as a counted medium in case that an identical medium is recounted.

It is possible to compute the total and selectively compute a certain election or a candidate, and the procedure in which a vote recording paper is transferred as the vote of a candidate and computed is visually displayed such as a moving image.

In counting, the state of the likeliest to be elected or decided to be elected is automatically displayed and the image and the career of the candidate may be displayed for each candidate by using a statistical computation. The present condition of computing with respect to an individual counting terminal, a certain election, or a certain candidate is displayed via a large-sized screen, which can be multiple partitioned, in a counting place and broadcasted via Internet in order to be known to public in real-time.

In the above, the voting data is stored in the recording medium and transferred offline. However, the electronic voting apparatus of the polling place is connected to the election management system of the counting place by network, thereby rapidly counting and totalizing. That is, the electronic voting apparatus may be equipped with an interface that can be attached or detached in order to be connected to wired/wireless network when necessary.

On the other hand, when an observer dissents in the process of counting in the counting place, the voting result storage medium and vote recording paper collected in the counting place are transferred to a designated examination system and an examination procedure is executed.

Figure 10:
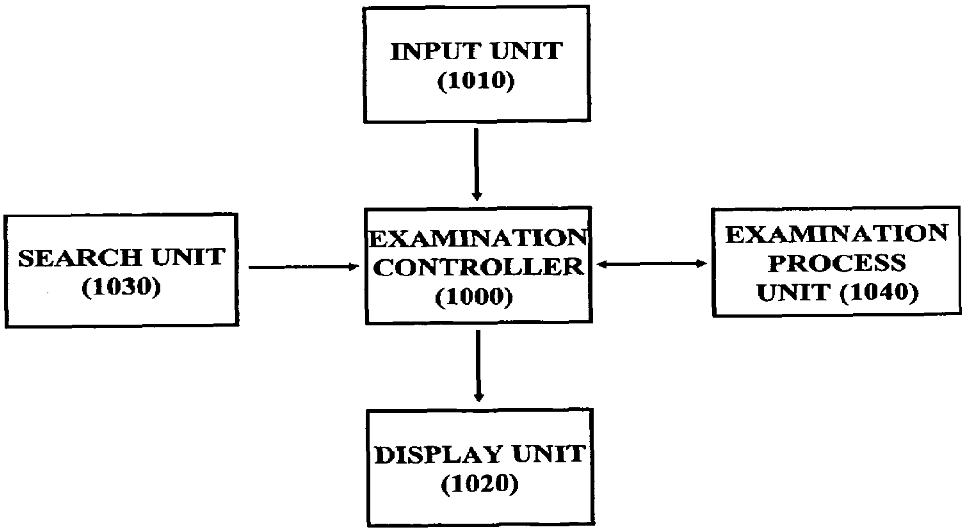
FIG. 10 is a block diagram illustrating the configuration of the electronic examination system according to an embodiment of the present invention.

FIG. 10 is a block diagram illustrating the configuration of an examination system according to an embodiment of the present invention.

As shown in FIG. 10, the examination system according to the present embodiment includes an input unit 1010 to which information, letter information or a barcode, recorded in a vote recording paper is inputted, a display unit 1020 outputting data related to the number of votes obtained and ballots, a search unit 1030 for inputting an instruction for searching a vote examination result, an examination process unit 1040 for examining votes, an examination controller 1000 managing the entire operation of the examination system. The input unit 1010 and the display unit 1020 may be installed forming a single input apparatus. The search unit 1030 can search the information of vote recording paper formed in a cartridge shape page by page, sequentially search a plurality of pages at low or high speed, and repeatedly search.

The display unit 1020 of the examination system enlarges and outputs the image of the vote recording paper or barcode read result inputted by the input unit 1010 or processes and outputs the read result such that a vote examination manager can rapidly and easily recognize the read result. Also, a state in which the examination result is classified for each candidate, election district, and polling place may be shown as moving images in order to be easily visually recognized.

The examination system is formed separately from the electronic voting apparatus described above. However, in order to directly input the vote recording paper, in which the voting result is printed, stored in the electronic voting apparatus, the examination system may be embodied to be attached or detached from the electronic voting apparatus. Also, the electronic voting apparatus is combined with the examination system, thereby embodying a voting and examination multifunctional device. In this case, a switch or button may be installed at the electronic voting apparatus or the voting and examination multifunctional device in order to switch a voting function to an examination function.

In the above, the electronic voting system using the electronic voting apparatus installed at the polling booth is described. However, in a real election procedure, a voting system using ballots according to the preference of voters or polling places may be used in addition to the electronic voting system.

On the other hand, among the various electronic voting and counting systems, the procedure executed, connected to network, online, may be switched to be offline when necessary. Also, a firewall system may be additionally constructed on network in order to effectively make provision against hacking attempted outside the electronic voting system.

The electronic voting system may be installed in polling places located in crowded places in addition to general polling places, such as departments, markets, the entrance of industrial complexes, the gateway of subway stations, and the entrance of parks, and resting places of express ways. Also, in case of rural districts far away from general polling places, the electronic voting apparatus may be installed at a mobile polling place such as vehicles. In this case, the procedure executed online such as the electoral register check operation of election judges may be performed in wired/wireless network via a wired/wireless network connection unit installed at a terminal for checking the electoral register.

As described above, according to the present invention, a system including a voter identification system shared via network and an electronic voting system operated online or offline is embodied, thereby effectively making provision against emergency situation such as hackings attempted outside or a system error.

Also, according to the present invention, since vote recording paper in which candidate selection result of voters is printed is collected separately from a voting result storage medium, counting and totalization is possible when a damage or error of voting result data stored in a storage medium of an electronic voting apparatus occurs, and verification after the fact is possible by using the vote recording paper as an evidence when a dispute with respect to the voting result occurs.

Since personal information related to a voter is not stored in an electronic voting card of the present invention and a storage medium and vote recording paper of the electronic voting apparatus except election district information and the voting result of the voter, a problem of leaking the personal information of the voter is prevented.

Also, since the electronic voting system can be easily and effectively paralleled with various voting methods such as paper voting and electronic voting, the management of democratic election system centering demanders instead of providers, in which the voter can directly select a convenient method, is possible.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An electronic voting system comprising:

a voter identification terminal which searches a predetermined voter database connected to network to identify voters and stores whether the voter votes in the voter database via a real-time storage method when the identification of the voter and whether the voter makes a double vote are finished;

an electronic voting card issue apparatus issuing an electronic voting card which has a function to display information on an election and an election district, and an image of candidate combination of a belonging election district and a function to remove stored information after voting is finished; and an electronic voting apparatus operated by interworking with the voter database using on-line or off-line method, guiding the voter with a balloting procedure when the voter deposits the electronic voting card, and storing a voting result by the voter, wherein the electronic voting apparatus comprises:

a candidate information storage unit storing the image of registered candidate combination of each election district;

a display unit displaying the image of the candidate combination of the election district to which the voter belongs stored in the candidate information storage unit, based on the information stored in the electronic voting card;

an input unit allowing the voter to select one of the candidates displayed on the display apparatus;

a voting result storage medium storing the voting result; and an output unit for printing and outputting the voting result on a vote recording paper, wherein the output unit of the electronic voting apparatus is installed in a protection box, and a transparent window is installed at one side of the protection box for showing the output surface of the output unit and an apparatus for displaying a state of vote progress by wire/wireless is installed to find a procedure of vote progress and a system error.

2. The system of claim 1, wherein the electronic voting system receives an administrator card which is in a form of smart card to authenticate the administrator and the system, and controls the voting to start in case that the authentication is successful.

3. The system of claim 2, wherein a vote recording paper collection means keeping the vote recording paper, on which the voting result is printed, by interworking with the printing of the output unit, is installed adjacent to the output unit.

4. The system of claim 3, wherein the vote recording paper collection means comprises a cartridge storing the vote recording paper in the form of a roll.

5. The system of claim 1, wherein a barcode with a particular form, which indicates information including the voting result, is printed on the vote recording paper and decoded only by a predetermined barcode reader.

6. The system of claim 1, wherein when vote is performed by the voter, the electronic voting apparatus deletes the information stored in the electronic voting card in order to reuse the electronic voting card.

7. The system of claim 1, wherein the electronic voting apparatus comprises:

an electronic voting card deposit unit transferring the inputted electronic voting card to the inside of the electronic voting apparatus and ejecting the electronic voting card outside when the entire voting procedure is finished; and an electronic voting card recognition unit reading the information stored or printed in the electronic voting card transferred inside.

8. The system of claim 1, wherein the electronic voting apparatus further comprises:

a voice guidance module storing voice data for guiding the balloting procedure;

a keypad with the top surface on which raised letters are embossed; and an earphone transmitting the voice data outside.

9. The system of claim 8, wherein the electronic voting apparatus activates only one of the input unit and the keypad, based on reading result of the information stored or printed in the electronic voting card.

10. The system of claim 1, wherein the voter identification terminal comprises an input unit to which identification information of the voter for identifying the voter is inputted.

11. The system of claim 10, wherein the identification information is an electronic signature using an electronic pen or biometrics.

12. The system of claim 1, wherein the electronic voting apparatus further comprises an encoding module encoding the result of the vote performed by the voter and storing the result in the voting result storage medium.

13. The system of claim 1, wherein the electronic voting card is one of a smart card having an algorithm for an electronic signature, encoding and security built-in, a magnetic card, a card on which a barcode is shown, and a Radio Frequency Identification (RFID) card.

14. The system of claim 1, wherein the voting result storage medium and candidate information storage unit are one of a Universal Serial Bus (USB) memory, Hard Disk Drive HDD), Floppy Disk Drive (FDD), Compact Disk (CD), Digital Video Disk (DVD), and flash memory.

15. The system of claim 1, wherein the external shape of the electronic voting apparatus is formed of a transparent material.

16. The system of claim 1, wherein the voter identification terminal and the electronic voting apparatus are installed in mobile polling places, and the voter identification terminal is connected to one of wire and wireless networks by one of wire and wireless connection units.

17. An electronic voting and vote-counting system including the electronic voting system of claim 1, the electronic voting and vote-counting system comprising:

a voting result reception terminal inputting the information stored in the voting result storage medium; and an election management system connected to the voting result reception terminal to count votes and totalize the voting result for each election or election district wherein the electronic voting and vote-counting system has a function of computing the total and selectively computing one of a certain election and a candidate;

a function of visually displaying a procedure of the computing;

a function of displaying the possibility of election, the image, and the career of the candidate for each candidate by using a statistical method; and a function of broadcasting the present condition of the computing of a counting place via internet in substantially real-time.

18. An electronic vote examination system performing vote examination by using the vote recording paper printed and outputted from the electronic voting system of claim 1, the system comprising:

an input unit inputting an information recorded in the vote recording paper;

a display unit outputting vote examination result based on the inputted information; and a search unit searching the vote examination result.

19. The system of claim 18, wherein the search unit selectively performs a function of searching information inputted in the form of a cartridge page by page, a function of sequentially searching a plurality of pages at low speed or high speed, and a function of repeated searching.

* * * * *